Patented Jan. 24, 1933

1,895,434

UNITED STATES PATENT OFFICE

ALFRED FEHRLE, OF BAD SODEN-ON-THE-TAUNUS, AND KARL STREITWOLF AND WALTER HERRMANN, OF FRANKFORT-ON-THE-MAIN, GERMANY, ASSIGNORS TO WINTHROP CHEMICAL COMPANY, INC., OF NEW YORK, N. Y., A CORPORATION OF NEW YORK

STABLE AQUEOUS SOLUTION OF NITROGEN-CONTAINING ORGANIC COMPOUNDS AND A PROCESS OF PREPARING THEM

No Drawing. Application filed April 3, 1930, Serial No. 441,421, and in Germany September 26, 1927.

Our present invention relates to stable aqueous solutions of nitrogen-containing organic compounds and a process of preparing them.

We have found that stable aqueous solutions of nitrogen-containing organic compounds are obtained by causing carbon-dioxide to act in the presence of water on an organic compound containing nitrogen, of the following general formula, or on a salt thereof

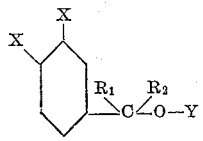

wherein X stands for hydrogen, alkyl, hydroxyl, amino or a substituted amino group, Y for hydrogen or an alkyl group substituted by a basic radical containing a N atom, $R_1$ for hydrogen and $R_2$ for an alkyl group substituted by a basic radical or $R_1$ and $R_2$ together for oxygen.

In this manner soluble carbonates are formed.

As parent materials for the invention there may be used organic basic compounds which are useful in therapy, and basic anesthetics, for instance, para-aminobenzoyl-diethyl-amino-ethanol, beta- methoxy-ethylamine-benzoic acid-beta-piperidyl-ethyl ester, cocaine, 3:4-dihydroxyphenyl-alpha-hydroxy-ethyl-beta-methyl-amine or the like, or a salt of any of these compounds. The solutions obtainable by the invention are distinguished by good stability, and, when applied therapeutically, well endured. In some cases, the solutions have a considerably stronger therapeutic effect in comparison with solutions of other salts of the same bases.

One method of carrying out the invention consists in suspending the free base in water, and introducing carbon dioxide into the suspension, whereby the base passes into solution. Another method consists in dissolving a salt of the base in water, liberating the base by addition of the corresponding quantity of alkali and transforming it into the soluble carbonate by simultaneous introduction of carbon dioxide. Furthermore, it is possible to provide the carbon dioxide required for the reaction by addition of a carbonate or bicarbonate to an acidified solution of a salt of the base; the carbon dioxide immediately reacts with the base present to form the carbonate.

The following examples illustrate the invention, but they are not intended to limit it thereto:—

(1) 0.9 gram of the hydrochloride of para-aminobenzoyl-diethyl-aminoethanol is dissolved in 30 cc of water, and the base is precipitated by means of 3.4 cc of normal caustic soda solution; carbon dioxide is immediately introduced, whereby the precipitate is dissolved. The solution contains the carbonate of the following probable formula

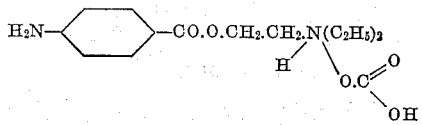

(2) 10 grams of para-aminobenzoyl-diethyl-aminoethanol are suspended in 160 cc of water and carbon dioxide is introduced while well stirring. As soon as the insoluble matter has become dissolved the solution is brought to a desired concentration by addition of water. The solution is as clear as water and has a feebly alkaline reaction.

(3) 0.2 gram of the hydrochloride of para-aminobenzoyl-diethylamino-ethanol is dissolved in 17.5 cc of water, and there are then added first 1 cc of 2N-hydrochloric acid and subsequently 1.5 cc of a 2N solution of sodium carbonate. The precipitate which is temporarily formed is immediately redissolved by the carbon dioxide which is evolved. The solution obtained in the foregoing manner is isotonic with blood. Solutions may be obtained in a similar manner from the isomeric and homologous esters.

(4) 0.7 gram of the hydrochloride of para-aminobenzoyl-gamma-dimethylamino-alpha, beta-dimethyl-propanol is dissolved in 30 cc of water and 2.5 cc of normal caustic soda solution are gradually added drop by drop, whilst introducing carbon dioxide. The base is precipitated temporarily and is immediately re-dissolved. The solution contains the carbonate of the following probable formula

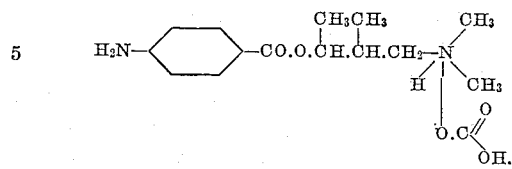

(5) 0.7 gram of the hydrochloride of para-aminobenzoyl-gamma-dimethylamino-alpha, beta-dimethyl-propanol is dissolved in 7.75 cc of water; there are then added first 2.5 cc of 2N-hydrochloric acid, and subsequently, drop by drop, 3.75 cc of a 2N solution of sodium carbonate. The base is temporarily precipitated, and is immediately redissolved by the carbon dioxide which is evolved.

(6) 0.85 gram of the hydrochloride of 4-beta-methoxyethylamino-benzoic acid-beta-piperidyl-ethyl ester is dissolved in 35 cc of water and 2.5 cc of normal caustic soda solution are gradually added drop by drop while introducing carbon dioxide. The precipitating base is immediately redissolved. The solution contains the carbonate of the following probable formula

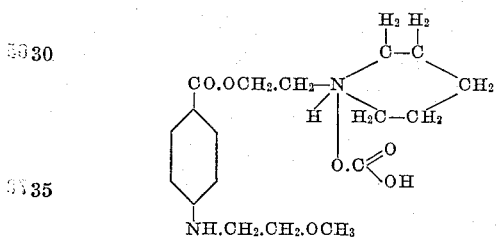

(7) 0.4 gram of cocaine hydrochloride is dissolved in 10.85 cc of water, and there are then added first 1.25 cc of 2N hydrochloric acid and subsequently, drop by drop, 1.9 cc of a 2N solution of sodium carbonate. A precipitate is produced, and is immediately redissolved. The solution contains the carbonate of the following probable formula

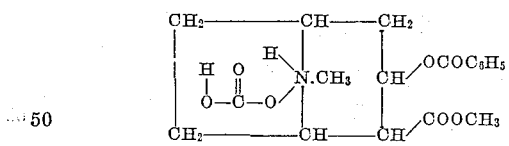

(8) 0.2 gram of cocaine hydrochloride is dissolved in 35 cc of water, carbon dioxide is introduced into the solution and subsequently there is added 0.6 cc of normal caustic soda solution drop by drop. The precipitate which forms is immediately redissolved. Solutions of the isomeric cocaines, for instance, of pseudo-cocaine may be obtained in a manner analogous to that described in this example or in Example 7.

(9) 0.2 gram of 3:4-dihydroxyphenyl-alpha-hydroxyethyl-beta-methylamine is dissolved in 150 cc of water and carbon dioxide is introduced. The base readily passes into solution in the form of the carbonate of the following probable formula

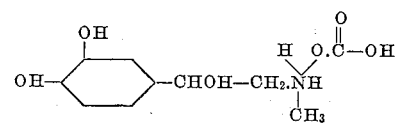

(10) 0.5 gram of the hydrochloride of phenyl-alpha-hydroxy-propyl-beta-methyl-amine is dissolved in 2 cc of water, and there are added 2.5 cc of caustic soda solution. The precipitate produced dissolves on introduction of carbon dioxide. The solution contains the carbonate of the following probable formula

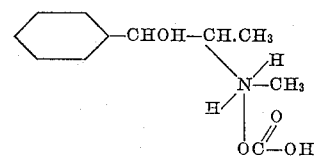

(11) 0.24 gram of the hydrochloride of 3:4-dihydroxyphenyl-alpha-hydroxyethyl-beta-methylamine is dissolved in 150 cc of water and 1.1 cc of 2N-hydrochloric acid are added. Whilst introducing carbon dioxide 1.65 cc of a solution of sodium carbonate is gradually added drop by drop. A clear solution is thus obtained which contains the carbonate of the following probable formula

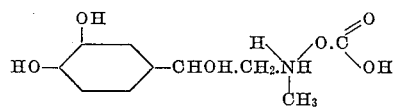

the concentration of which is then adjusted to a desired value.

We claim:

1. The process which consists in causing carbon dioxide to act in the presence of water on a compound of the following general formula:

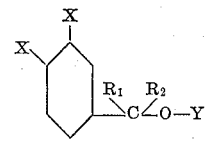

wherein X stands for hydrogen, alkyl, hydroxyl, amino or a substituted amino group, Y for hydrogen or an alkyl group substituted by a basic radical containing a N atom, $R_1$ for hydrogen and $R_2$ for an alkyl group substituted by a basic radical or $R_1$ and $R_2$ together for oxygen.

2. The process which consists in causing carbon dioxide to act in the presence of water on a compound of the following general formula:

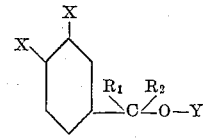

wherein X stands for hydrogen, hydroxyl, amino or a substituted amino group, Y for hydrogen or a radical:

$R_1$ for hydrogen and $R_2$ for a radical

Z being hydrogen or alkyl, or $R_1$ and $R_2$ together for oxygen.

3. The process which consists in causing carbon dioxide to act in the presence of water on a compound of the following general formula:

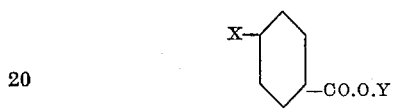

wherein X stands for amino or a substituted amino group and Y for an alkyl group substituted by a basic radical containing a N atom.

4. The process which consists in causing carbon dioxide to act in the presence of water on a compound of the following general formula:

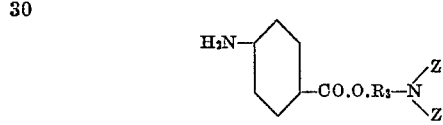

wherein Z stands for hydrogen or alkyl and $R_3$ for alkyl.

5. The process which consists in causing carbon dioxide to act in the presence of water on a compound of the following general formula:

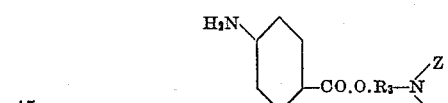

wherein Z stands for hydrogen or alkyl and $R_3$ for $-CH_2.CH_2-$ or

6. The process which consists in causing carbon dioxide to act in the presence of water on a compound of the following general formula:

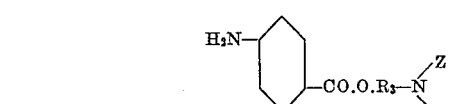

wherein Z stands for methyl or ethyl and $R_3$ for $-CH_2.CH_2-$ or

7. The process which consists in treating a compound of the following formula:

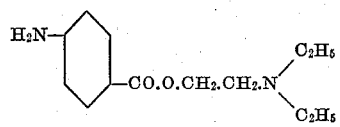

in an aqueous suspension with carbon dioxide.

8. The aqueous solutions of a carbonate of a compound of the following general formula:

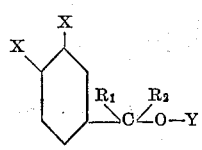

wherein X stands for hydrogen alkyl, hydroxyl, amino or a substituted amino group, Y for hydrogen or an alkyl group substituted by a basic radical containing a N atom, $R_1$ for hydrogen and $R_2$ for an alkyl group substituted by a basic radical or $R_1$ and $R_2$ together for oxygen, the said solutions being stable and of therapeutical value.

9. The aqueous solutions of a carbonate of a compound of the following general formula:

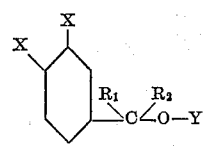

wherein X stands for hydrogen, hydroxyl, amino or a substituted amino group, Y for hydrogen or a radical:

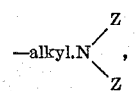

$R_1$ for hydrogen and $R_2$ for a radical:

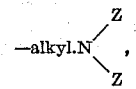

Z being hydrogen or alkyl, or $R_1$ and $R_2$ together for oxygen, the said solutions being stable and of therapeutical value.

10. The aqueous solutions of a carbonate of a compound of the following general formula:

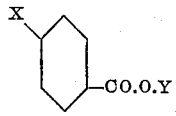

wherein X stands for amino or a substituted amino group and Y for an alkyl group substituted by a basic radical containing a N atom, the said solutions being stable and of therapeutical value.

11. The aqueous solutions of a carbonate of a compound of the following general formula:

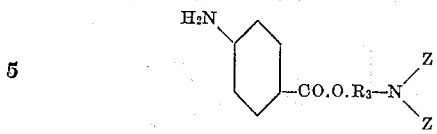

wherein Z stands for hydrogen or alkyl and $R_3$ for alkyl, the said solutions being stable and of therapeutical value.

12. The aqueous solutions of a carbonate of a compound of the following general formula:

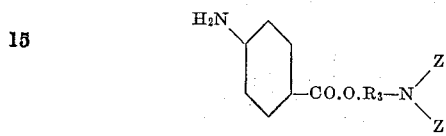

wherein Z stands for hydrogen or alkyl and $R_3$ for —$CH_2.CH_2$— or

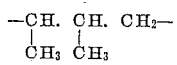

the said solutions being stable and of therapeutical value.

13. The aqueous solutions of a carbonate of a compound of the following general formula:

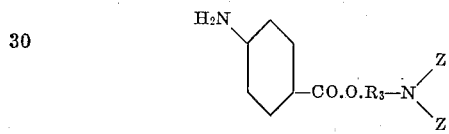

wherein Z stands for methyl or ethyl and $R_3$ for —$CH_2.CH_2$— or

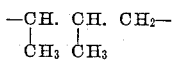

the said solutions being stable and of therapeutical value.

14. The aqueous solutions of the carbonate of the compound of the following formula:

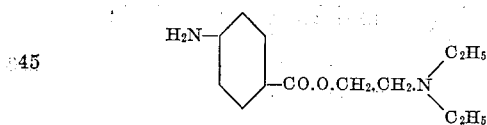

the said solutions being stable and of therapeutical value.

In testimony whereof, we affix our signatures.

ALFRED FEHRLE.
KARL STREITWOLF.
WALTER HERRMANN.